United States Patent [19]
Tian et al.

[11] Patent Number: 5,910,875
[45] Date of Patent: Jun. 8, 1999

[54] DEVICE FOR PREVENTIVE DETECTION OF FAULTS WITH RECOGNITION OF THE TYPE OF LOAD

[75] Inventors: Simon Tian, Grenoble; Jean-Marc Kasbarian, Marseille, both of France

[73] Assignee: Schneider Electric SA, France

[21] Appl. No.: 08/905,959

[22] Filed: Aug. 5, 1997

[30] Foreign Application Priority Data

Sep. 3, 1996 [FR] France ................................. 96 10980

[51] Int. Cl.$^6$ .................................................. H02H 3/26
[52] U.S. Cl. .................................................. 361/78; 361/1
[58] Field of Search .................................. 361/1, 62, 78, 361/93; 307/38, 85, 86; 324/133

[56] References Cited

U.S. PATENT DOCUMENTS 5,708,551 1/1998 Bosatelli ................................. 361/62

FOREIGN PATENT DOCUMENTS 0581078  2/1994  European Pat. Off. .
95/06349 3/1995  WIPO .

*Primary Examiner*—Sally C. Medley
*Attorney, Agent, or Firm*—Parkhurst & Wendel

[57] ABSTRACT

The device comprises an electronic switch able to temporarily connect a load to an AC power supply system so as to apply the power system voltage to the load during a test phase corresponding to a half-wave of the power system voltage. A control circuit of the electronic switch measures the output current and voltage of the device and calculates the load impedance. It compares the variation of the load impedance during the test phase to curves representative of different types of load. The device performs preventive overload detection by estimating the rated power of the load according to the type of load detected.

13 Claims, 10 Drawing Sheets

DEVICE FOR PREVENTIVE DETECTION OF FAULTS WITH RECOGNITION OF THE TYPE OF LOAD

BACKGROUND OF THE INVENTION

The invention relates to a device for preventive detection of faults in a load connected to an AC electrical power supply system by means of a first switch, a device comprising control means controlling the first switch, the control means comprising means for detecting the type of load and means for detecting a fault with test means to temporarily connect the load to test power supply means, and means for measuring the current in the load.

A known device (EP-A-581,078) comprises an optical circuit for detecting connection of a plug in a socket connected to the electrical mains power system. It then performs fault detection by measuring the current in the load when the latter is supplied under low power either by a pulse generator or by the mains power system via a step-down transformer. This document indicates that it is possible to detect the type of loads, more particularly the fact that the load is purely dissipative or not, from measurement of the current when the test power supply is constituted by a pulse generator. It does not however provide any details on how this detection is performed. In practice, the device described does not really enable recognition of the nature of the load and fault detection is not adapted to the type of load.

SUMMARY OF THE INVENTION

The object of the invention is to achieve a device enabling a real identification of the nature of the load so as to enable preventive fault detection satisfactory for all types of load and notably for non-linear loads.

This object is achieved by the fact that the first switch comprises an electronic switch able to be temporarily closed by the control means so as to apply the AC voltage of the power system to the load during a first test phase corresponding to a half-wave of said voltage, the control means comprising means for measuring the output voltage of the first switch, the means for detecting the type of load comprising means for calculating the impedance connected to the means for measuring the current and voltage, and means for comparing the evolution of the impedance during the first test phase to predetermined impedance curves representative of different types of load.

Analysis of the output voltage and current under full voltage, i.e. at the rated voltage of the power system, during a half-wave enables the type of load to be recognized.

According to a development of the invention, the means for comparison comprise means for determining the signs of a plurality of values representative of the derivative of the impedance versus time during the first test phase and means for comparing said signs to predetermined successions of signs representative of the impedance curves of the different types of load.

According to another development of the invention, the means for detecting a fault comprise means for detecting an overload comprising means for estimating the rated power of the load adapted to the type of load detected, means for comparing the estimated rated power with a preset power threshold representative of the power available on output of the device, and means for indicating an overload if the estimated rated power exceeds the power threshold.

Detection of an overload is thus correlated to the type of load detected. For a non-linear load, the behaviour of the load under transient conditions, or when cold, is not representative of its permanent behaviour under rated voltage. However, for a given type of load, it is possible to estimate the nominal behaviour of the load from determination of the transient, or cold, operating characteristics of the load performed by means of measurements made during a test period. The possible presence of a fault due to an overload can then be detected from the estimated nominal behaviour.

Depending on the type of load detected, determination of the cold operating characteristics of the load is performed either from measurements made during the first test phase during which the load is supplied under full voltage during a half-wave, or during a second test phase during which the load is supplied under low power.

According to a preferred embodiment, during the second test phase the control means temporarily close the electronic switch so as to apply the AC voltage of the power system to the load during a limited period of the power system voltage cycle so that the instantaneous voltage applied to the load remains lower than a preset peak voltage which is much lower than the peak voltage of the power system.

The device also preferably comprises means for detecting a short-circuit comprising means for comparing the current measured in the load during the second test phase to a preset current threshold.

It can in addition comprise means for detecting a differential fault comprising means for measuring the differential current in the load during the second test phase, means for comparing the differential current with a preset differential current threshold, and means for indicating a differential fault if the differential current measured exceeds the differential current threshold.

According to another development of the invention, the device comprises means for power-on of the load comprising a second switch connected, in series with a resistor of high value, in parallel to the first switch, means for closing the second switch during a prior test phase during which the first switch is open, means for comparing the output voltage of the first switch with a preset voltage threshold, the control means performing detection of the type of load, and fault detection if the output voltage during the prior test phase is lower than or equal to said voltage threshold.

BRIEF DESCRIPTION OF THE DRAWINGS

Other advantages and features will become more clearly apparent from the following description of different embodiments of the invention given as non-restrictive examples only and represented by the accompanying drawings in which.

DETAILED DESCRIPTION OF THE PREFERRED EMBODIMENT

Figure 1:
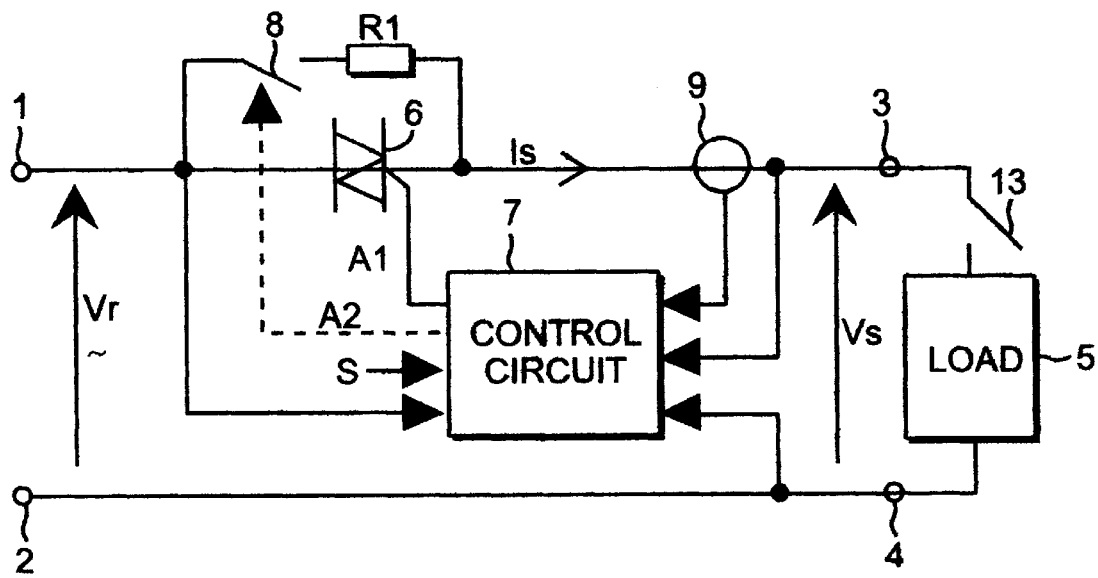
FIGS. 1 and 2 represent, in block diagram form, two particular embodiments of a device according to the invention.

As represented in FIG. 1, the device according to the invention comprises two input terminals 1 and 2 connected to an AC electrical power system. The voltage Vr of the power system is therefore applied between the terminals 1 and 2. The device comprises two output terminals 3 and 4 between which a load 5 can be connected. The terminals 2 and 4 are connected directly to one another, whereas the terminals 1 and 3 are connected by means of a first switch. In the particular embodiment of FIG. 1, the first switch is constituted by a triac 6 receiving on a control electrode control signals A1 of a control circuit 7.

A second switch 8 is connected in series with a resistor R1 of high value between the terminals 1 and 3. The switch 8 is controlled by control signals A2 of the control circuit 7. The switch 8 can be constituted by an electronic switch, for example an optotriac, or by the contact of a low current mechanical relay.

The device comprises a circuit for measuring the output current Is, for example formed by a toroid 9 connected line-side from the output terminal 3. The toroid 9 supplies the control circuit 7 with signals representative of the current Is. The output voltage Vs of the first switch measured between the output terminals 3 and 4 is also applied to inputs of the control circuit 7.

Figure 2:
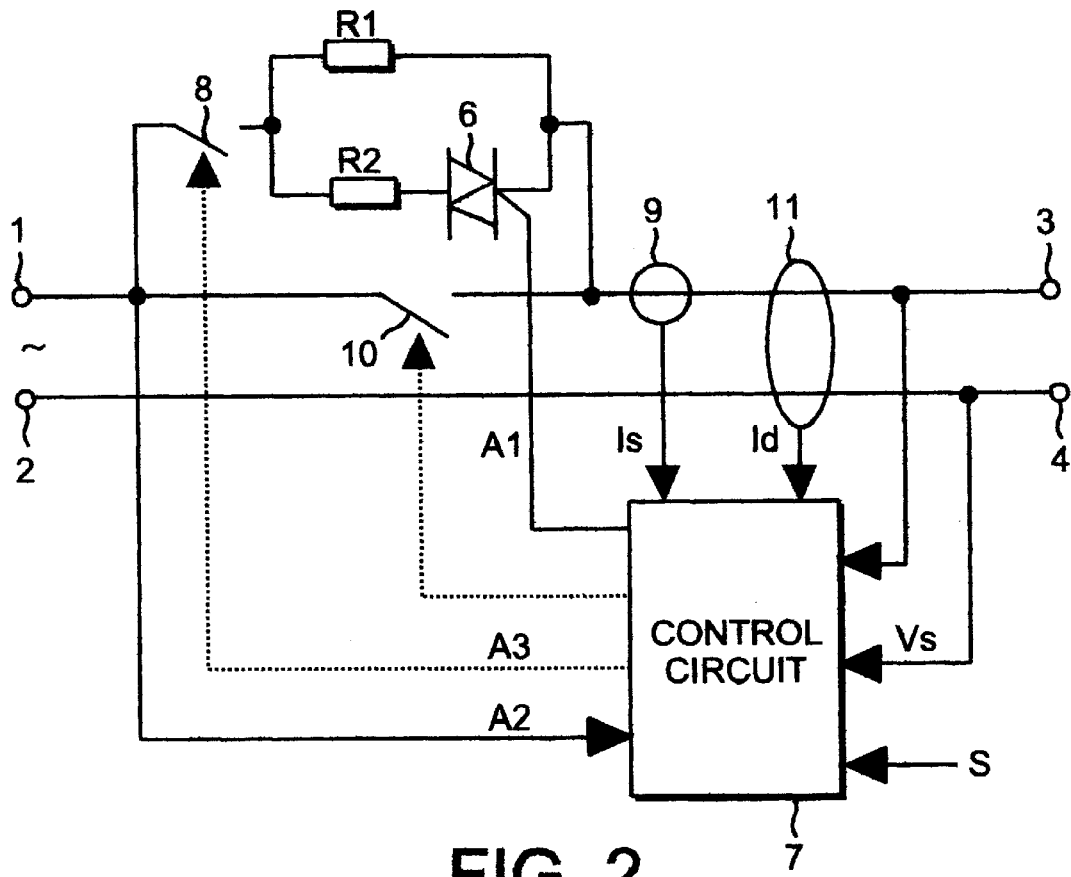

In the particular embodiment represented in FIG. 2, the first switch comprises a mechanical switch 10 connected between the terminals 1 and 3 and controlled by output signals A3 of the control circuit 7. The first switch also comprises a triac 6, controlled by the signals A1, connected in series with a protective resistor R2 of low value in parallel with the resistor R1. The first switch is in this case formed by parallel connection, between the terminals 1 and 3, of the switch 10 on the one hand and of the series circuit formed by the second switch 8, resistor R2 and triac 6 on the other hand.

In FIG. 2, a differential current measuring circuit formed by a differential toroid 11 surrounding the two conductors arranged line-side from the output terminals 3 and 4 supplies the control circuit 7 with signals representative of the differential current Id in the load. A measuring circuit of the same type can also be provided in the embodiment of FIG. 1.

Figure 3:
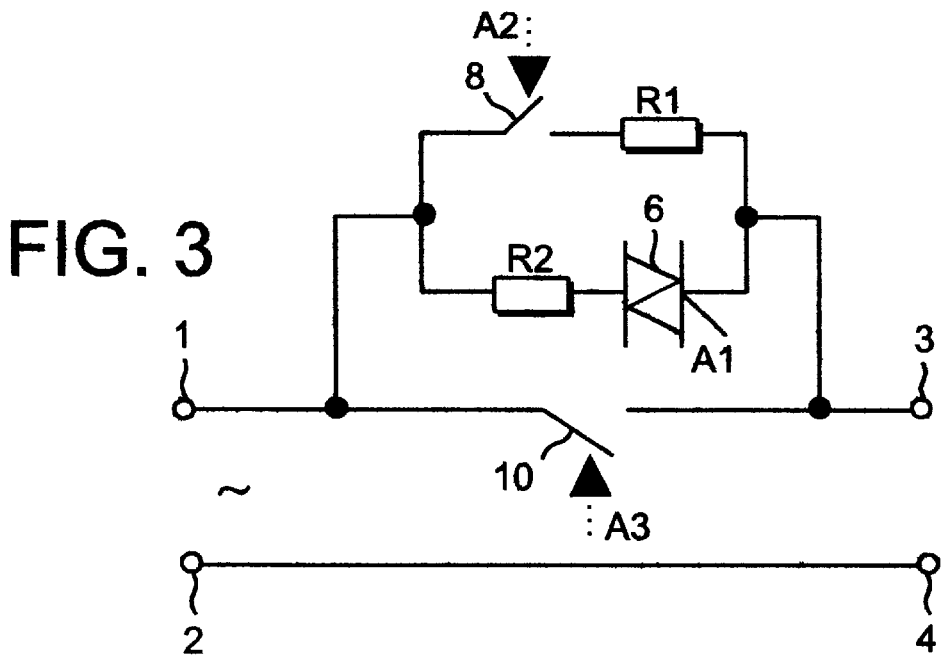
FIG. 3 illustrates an alternative embodiment of the device according to FIG. 2.

In the alternative embodiment of FIG. 3, the series circuit formed by the triac 6 and the protective resistor R2 is connected in parallel with the mechanical switch 10. In this case, the first switch is formed by parallel connection, between the terminals 1 and 3, of the switch 10 on the one hand and of the series circuit formed by the triac 6 and the resistor R2 on the other hand.

Figure 4:
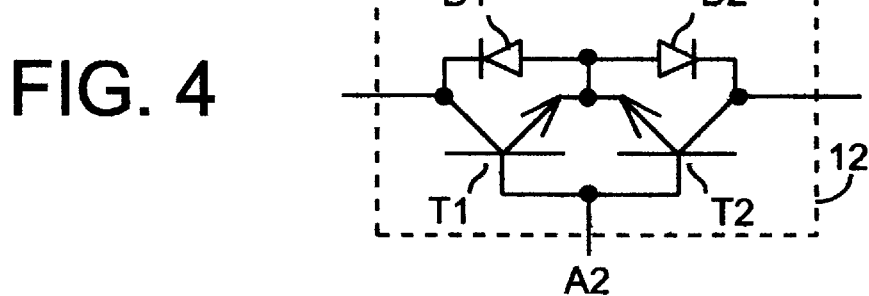
FIG. 4 represents another particular embodiment of the electronic switch of the devices according to FIGS. 1 to 3.

The triac 6 of FIGS. 1 to 3 can be replaced by any suitable electronic switch. A particular embodiment of an electronic switch 12 is represented in FIG. 4. It is formed by two transistors T1 and T2 whose emitters are connected to a common point and whose bases are connected to form the control electrode of the switch receiving the control signals A1. The collectors of T1 and T2 respectively constitute the input and output of the electronic switch 12. The anodes of diodes D1 and D2 are connected to the emitters of T1 and T2, whereas their cathodes are respectively connected to the collectors of T1 and T2.

As an example, the voltage Vr of the power system is about 230 V, the resistance of R1 about 100 kiloohms and the resistance of R2 about 1 ohm.

Operation of the device according to the invention will be described in greater detail hereafter with respect to the flowchart of FIG. 5.

The device for preventive detection of faults can be integrated in a circuit breaker or in a controllable electrical socket, called an intelligent socket. In the case of a circuit breaker, each closing of the circuit breaker, whether manual or automatic, causes an initialization signal S to be applied to the control circuit 7. In the case of a socket, it is plugging-in of a plug, able to be connected to a wide diversity of loads of all kinds, which causes the initialization signal S to be applied to the control circuit 7. As an example, the signal S can be produced by an optical presence detection circuit of the type described in the above-mentioned document EP-A-581,078.

The switches 6, 8, and possibly 10, being open, application of the signal S to the circuit 7 triggers an initialization stage (F1). The control circuit 7 then runs a prior test phase, or load power-on detection phase. The load 5 can in fact, as represented in FIG. 1, be connected to the output terminals 3 and 4 by a power-on switch 13. So long as this switch is open, the load, although it is present, is not powered on. To detect this power-on, the control circuit proceeds (stage F2) with closing of the second switch 8 by applying thereto closing control signals (A2=1 in the embodiment represented), while keeping the first switch open (A1=0 and if applicable, for FIG. 2, also A3=0).

In a stage F3, the control circuit 7 measures the output voltage Vs, then compares (stage F4) the measured voltage to a threshold voltage $Vs_{thresh}$. When Vs is lower than or equal to the threshold voltage, the control circuit considers that the load is present and that its power-on is commanded (switch 13 closed). It then (Yes output of F4) goes on to the following short-circuit fault detection phase. On the other hand, so long as Vs remains greater than the threshold (No output of F4), the load is not considered to be powered on (switch 13 open) and the control circuit loops back to stage F3.

Figure 6:
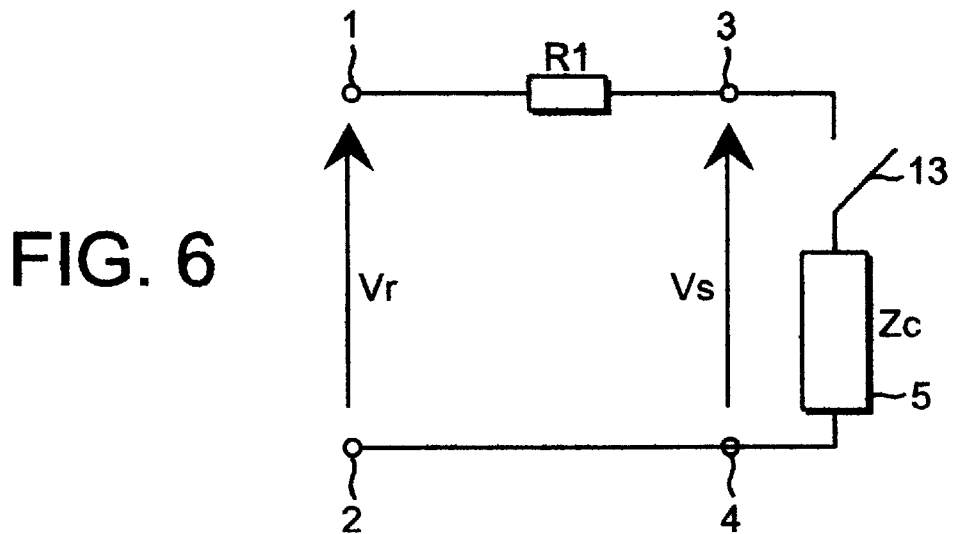
FIG. 6 represents an equivalent electrical diagram of the device according to the invention during the load power-up detection phase.

The equivalent electrical diagram of FIG. 6 represents the electrical voltages applied to the input and output of the circuit during the load power-on detection phase. The switch 8 being closed, the power system voltage Vr is applied to the terminals of a circuit comprising, in series, the resistor R1, the switch 13 and the load 5 of impedance Zc. So long as the switch 13 is open, the output voltage Vs is equal to the power system voltage Vr. As the resistor R1 has a high value, the short-circuit current is in all cases limited to a low, non-dangerous value. When the load is powered on by closing of the switch 13, the voltage Vs decreases. This decrease is detected by the control circuit 7 which then goes on to the next phase.

As a non-restrictive example, if Vr=230V and R1=100 kiloohms, the short-circuit current is limited to 2.3 mA and the maximum power dissipated in the resistor is 0.53 W. If all the loads able to be connected to the socket or circuit breaker are assumed to have a power greater than 3 W, i.e. a charging resistance lower than or equal to 17.6 kiloohms, then the threshold voltage $Vs_{thresh}$ is fixed at:

$$Vs_{thresh} = (230 \times 17.6)/(100+17.6) = 34.5 \text{ V}$$

The short-circuit fault detection phase starts with a stage F5 of opening of the second switch 8 (A2=0) and temporary closing, or turn-on, of the electronic switch (6 or 12) to apply the power system voltage to the load for a preset limited duration of the cycle of Vr, so that the instantaneous voltage Vs applied to the load remains lower than a preset peak voltage Vp which is much lower than the peak voltage of the power system. In this way, the load 5 is supplied at low power during this phase. For this the control signals A1 are logic signals which command closing of the electronic switch with a predetermined phase difference with respect to the power system voltage Vr when passing zero.

To ensure synchronization of the signals A1 on the power system voltage, the latter is applied to an input of the control circuit 7 (FIGS. 1 and 2).

Figure 7:
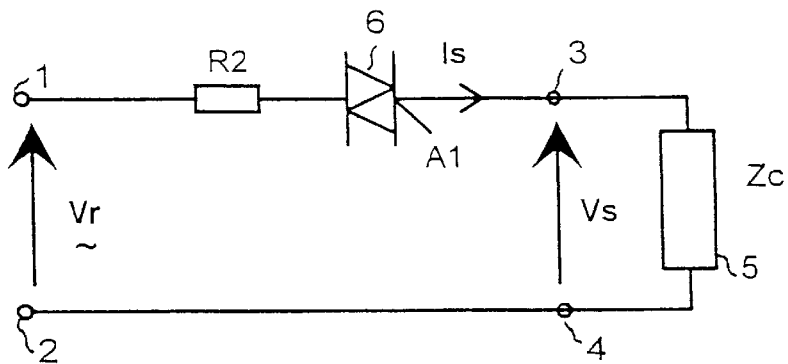
FIG. 7 represents an equivalent electrical diagram of the device according to the invention during the first and second test phases.

FIG. 7 represents the equivalent electrical diagram of the circuit during the fault detection phase. In the embodiments of FIGS. 1 and 3, the second switch 8 being open, the load 5, of impedance Zc, is connected to the terminal 1 by R2 and the triac 6 controlled by the signals A1. In the case of FIG. 2, the second switch 8 being in series with the triac 6, the control signals A2 must remain at their logic value 1 during the fault detection phase, and the resistor R1 is then in parallel with the assembly formed by R2 and the triac 6 in the diagram of FIG. 7. However, the respective values of R1 and R2 are such that the resistor R1 does not play any role and the description which follows is consequently valid both for the embodiment of FIG. 2 and for the embodiments of FIGS. 1 and 3.

Figure 8A:
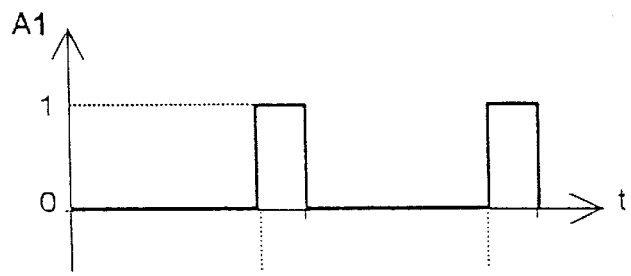
FIGS. 8a and 8b respectively illustrate the wave forms of the control signals A1 of the electronic switch and of the voltage Vs applied to the load during the second test phase in the device according to FIG. 7.
Figure 8B:
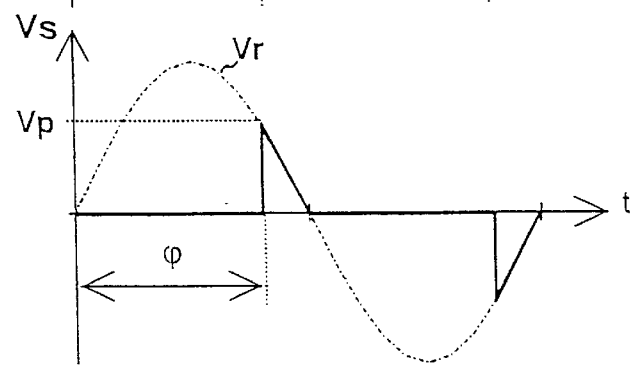

In the case of a triac 6, the signals A1 are preferably as represented in FIG. 8a, which supplies on output signals Vs as represented in FIG. 8b. In FIG. 8b the power system voltage Vr is represented by a broken line. An impulse A1 of logic value 1 is applied to the control electrode of the triac with a phase difference φ with respect to each time the power system voltage Vr passes zero. The triac is therefore on during a short instant of each half-wave between application of the impulse A1 and the following passage of Vr at zero, the instantaneous voltage Vs remaining, in absolute value, lower than the peak voltage Vp (FIG. 8b).

For an rms value of 230V of the power system voltage Vr, the peak voltage Vp is preferably lower than 50 V. In a preferred embodiment Vp=20 V. The phase difference angle φ can then be calculated by the equation:

$$Vp = \sqrt{2} \times 230 \times \sin \phi$$

i.e. φ=176°, which for a power system frequency of 50 Hz corresponds to a phase difference of 9.8 ms. As an example, if Vp=20 V, for the current in the triac to be limited to 20A in the event of a short-circuit, a protective resistor R2 of 1 ohm resistance is chosen.

Figure 9A:
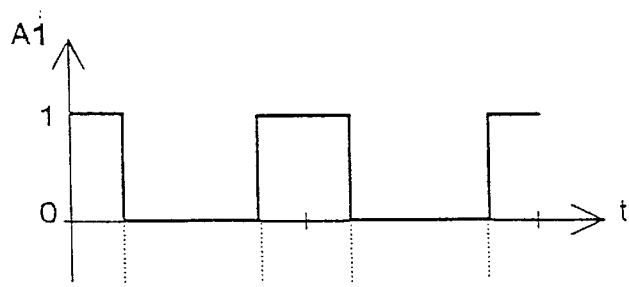
FIGS. 9a and 9b respectively illustrate alternative embodiments of the signals A1 and Vs when the electronic switch is of the type represented in FIG. 4.
Figure 9B:
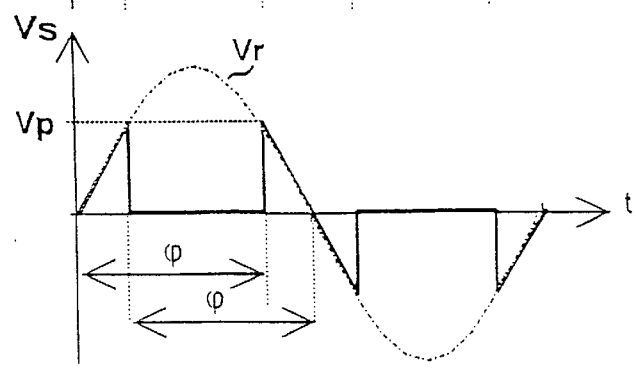

In the embodiment of FIGS. 8a and 8b, two fractions of sine wave of opposite signs are applied to the load. This is justified in the presence of asymmetric loads. Moreover, if the electronic switch is achieved with transistors, as in FIG. 4, the signals A1 may be of the type represented in FIG. 9a. In this case A1 takes, as previously, the logic value 1 after a phase difference φ. However the switch does not open automatically when the power system voltage reaches zero, but its opening or turn-off is commanded by the A1 going to the logic value zero, preferably with the same phase difference φ with respect to the next passage of Vr at zero. The wave form represented in FIG. 9b is thus obtained for Vs.

The stage F5 is followed by a stage F6 (FIG. 5) of measurement of the current Is in the load, then by a stage F7 of comparison of Is with a current threshold $Is_{thresh}$. If the current Is is lower than or equal to the current threshold, this is interpreted as an absence of short-circuit and the control circuit continues its test program. If on the other hand Is is greater than the current threshold, the load is then considered (No output of F7) as presenting a short-circuit. The control circuit then goes on to a fault indication stage F8, indicating the short-circuit, before returning to the stage F1.

As an example, we can take 5 ohms as the limit short-circuit resistance for the load, which corresponds to a power greater than 10 kW. In this case the short-circuit detection current threshold is given by the equation:

$$Is_{thresh} = Vp/(R\text{short-circuit} + R2)$$

i.e.

$$Is_{thresh} = 20/(5+1) = 3.3 \text{ A.}$$

In the absence of a short-circuit being detected (Yes output of F7), the control circuit then goes on to a differential fault detection phase.

A differential fault current is considered to vary linearly with the voltage applied, and the differential current under rated voltage is consequently considered to be able to be estimated by measurement under reduced voltage.

Measurement of the differential current by the toroid 11 can be performed either with the equivalent setup corresponding to the load power-on detection phase (FIG. 6) or with the equivalent setup corresponding to the short-circuit fault detection phase (FIGS. 7 to 9). In FIG. 5 it is the latter case that is represented. The commands A2 and A1 being unchanged since the stage F7, the control circuit measures the differential current Id during a stage F9. Then it calculates the differential current $Id_{rated}$ under rated voltage during a phase F10 and compares $Id_{rated}$ with a differential current threshold $Id_{thresh}$ during a phase F11. If $Id_{rated}$ is lower than or equal to $Id_{thresh}$, the control circuit considers that there is no differential fault and the control circuit continues its test program. If on the other hand $Id_{rated}$ is greater than $Id_{thresh}$, a differential fault is then detected (No output of F11) and the control circuit goes on to the fault indication stage F8, indicating a differential fault. As an example, with the setup of FIGS. 5 and 7, for a load of 10 kW i.e. 5 ohms, the minimum voltage Vp at the terminals of the load is given by (20×5)/(5+1)=16.7 V. The differential current under rated voltage (230V) is given by: $Id_{rated} = Id \times 230/16.7$ V. The protection threshold $Id_{thresh}$ is for example set to 30 mA.

If the setup of FIG. 6 is chosen, a stage equivalent to F2 is introduced between F7 and F9, calculation of $Id_{rated}$ being modified accordingly. It is also possible to perform differential fault detection before short-circuit detection, stages F9 to F11 then being inserted between stages F4 and F5.

In the absence of short-circuit fault and differential fault detection (Yes output of F11), the control circuit then goes on to an overload detection phase.

Figure 10A:
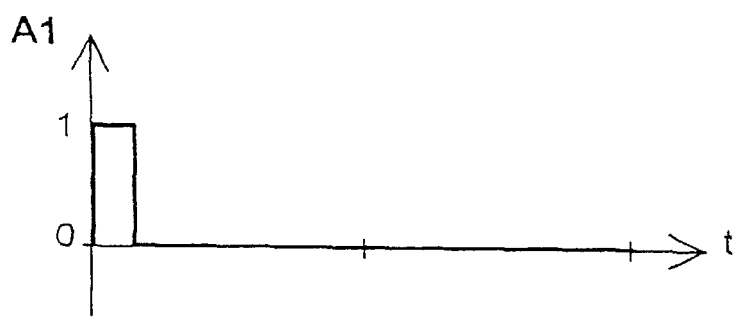
FIGS. 10a to 10d respectively illustrate the wave forms of the signals A1, Vs, of the output current Is and of the impedance Zs of the load during the first test phase.
Figure 10B:
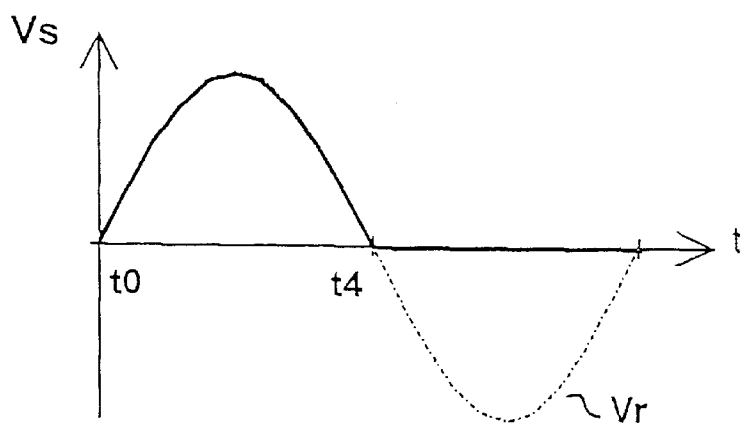

To detect an overload, the control circuit first identifies the type of load which has been connected to the output terminals 3 and 4 of the device. For this purpose the electronic switch 6, 12 is closed, i.e. turned on, during a voltage half-wave Vr of the power system (stage F12). In the case of a triac 6, the signals A1 are of the type represented in FIG. 10a. An impulse is applied when Vr passes zero turning the triac 6 on until the next time Vr passes zero (FIG. 10b). The load 5 is thus supplied under full voltage during a voltage half-wave of the power system, i.e. during ½ period of Vr, synchronized with the passage of the voltage Vr at zero. It should be noted that the resistor R2 is no longer sufficient to protect the triac 6 in the event of a short-circuit. However the short-circuit detection phase enabled this possibility to be discarded before connecting the load at full voltage.

Figure 10C:
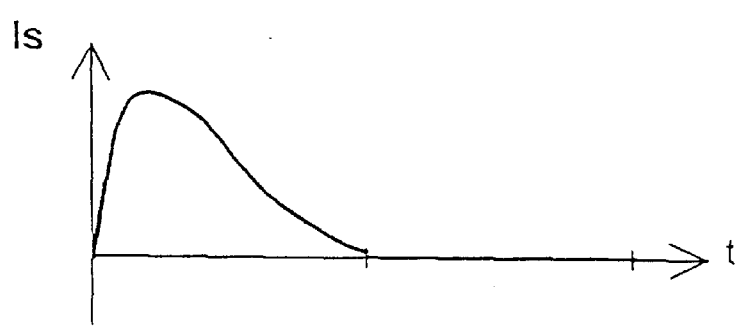
Figure 10D:
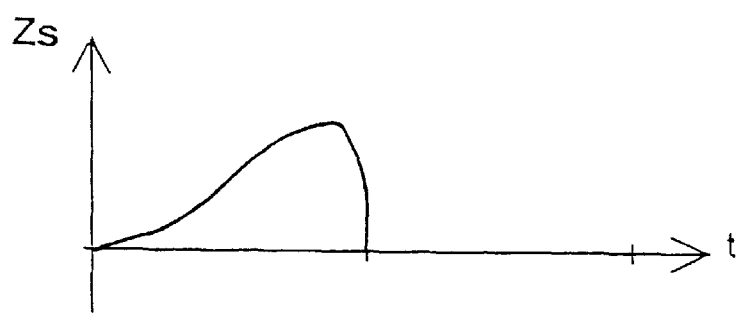

The form of the impedance of a load, linear or not, when a first power system voltage half-wave is applied to it, is characteristic of the nature of this load. As an example, FIGS. 10c and 10d illustrate the current Is during such a half-wave and the calculated impedance Zs corresponding to the measured quantities Is and Vs, the load being constituted by an incandescent bulb.

Figure 11A:
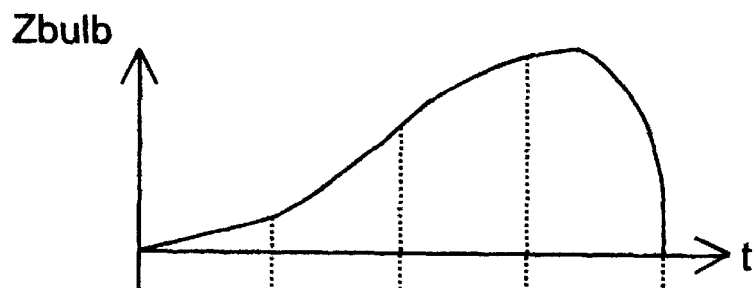
FIGS. 11a to 11e illustrate the variations of the impedance Zs of the load when a first power system voltage half-wave is applied, respectively for a load constituted by an incandescent bulb, a convector, a motor, a neon and a switching power supply.
Figure 11B:
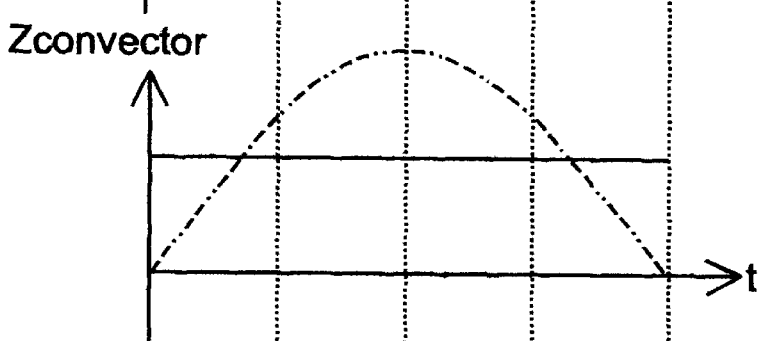
Figure 11C:
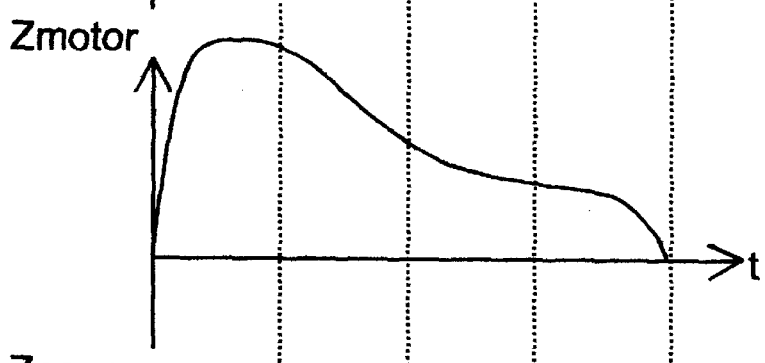
Figure 11D:
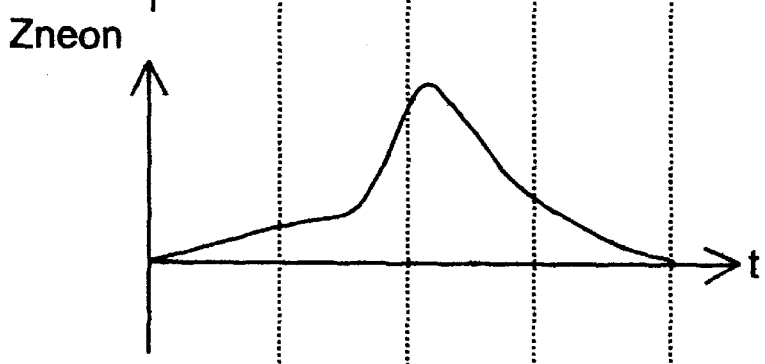
Figure 11E:
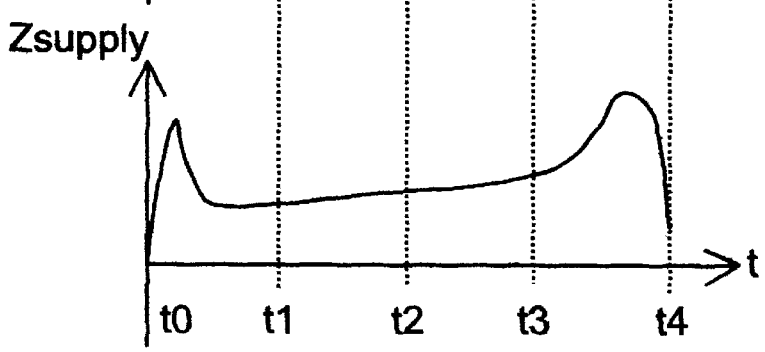

FIGS. 11a to 11e illustrate the characteristic impedances on a first half-wave of rated voltage for various types of load, i.e. an incandescent bulb (FIG. 11a), a convector (FIG. 11b), a motor, for example a small vacuum cleaner motor (FIG. 11c), a fluorescent lamp, for example a neon (FIG. 11d) and a switching power supply, for example of the type used by a computer or another load of computer hardware type (FIG. 11e).

Figure 12:
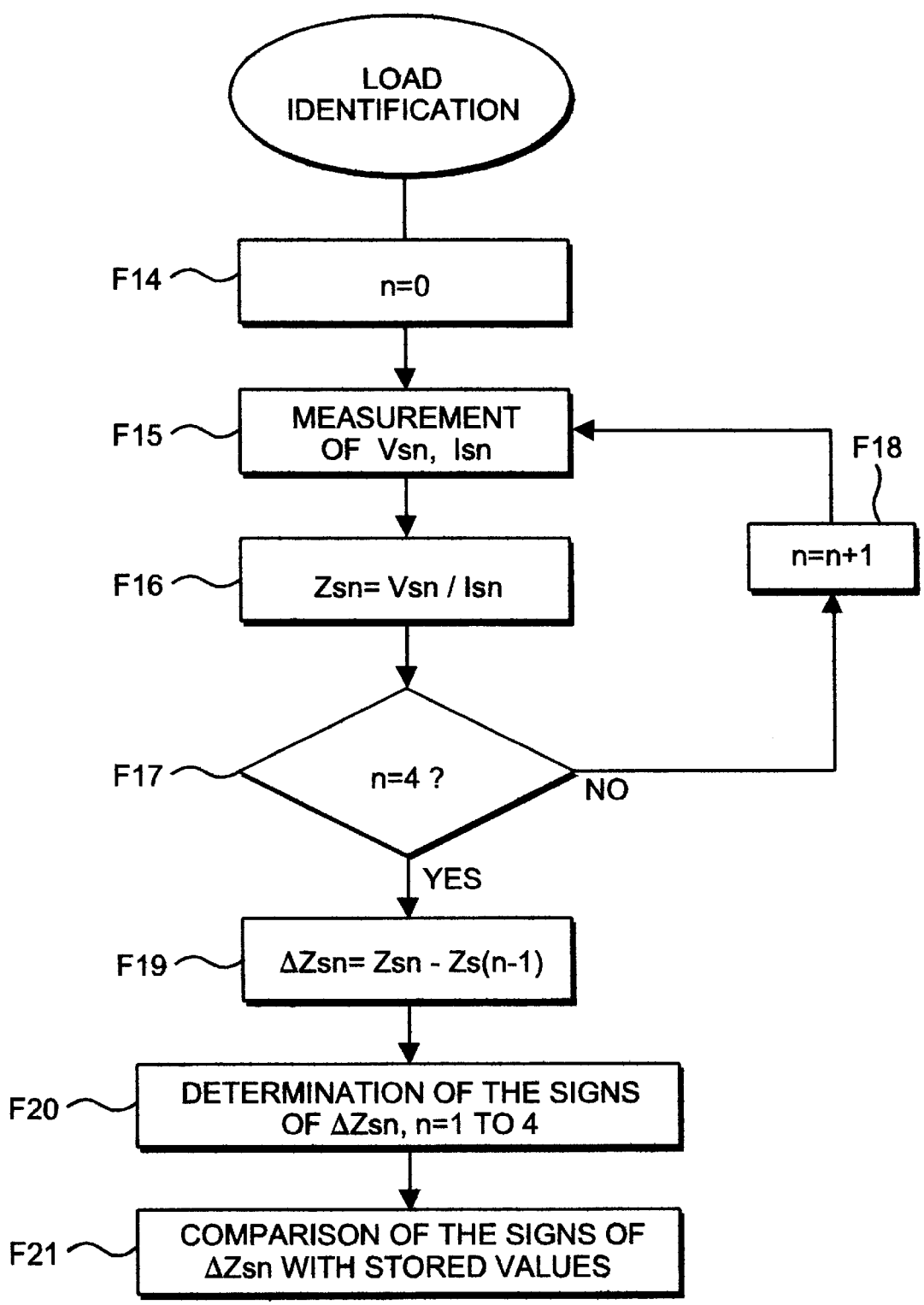
FIG. 12 represents a particular embodiment of the load identification stage of FIG. 5.

A particular embodiment of the type of load identification stage F13 is represented in FIG. 12. In this embodiment, the control circuit performs five measurements Isn and Vsn of the current Is and voltage Vs, with n=0 to 4, at predetermined times t0 to t4 of the half-wave of the power system voltage during which the electronic switch is on.

In FIG. 12, a stage F14 corresponds to zero resetting of n. Then the corresponding values Vsn and Isn are measured and stored in a stage F15. The corresponding impedance Zsn=Vsn/Isn is calculated at F16. Then, in stage F17, the value of n is compared to 4. If n is different from 4, the control circuit increments n in a stage F18:n=n+1 before looping back to measurement of Isn and Vsn at F15.

When n=4 (Yes output of F17), the control circuit then has stored in memory five successive values Zsn, n=0 to 4, of the load impedance calculated from the values of Isn and Vsn measured during the half-wave t0–t4 during which the power system voltage was applied to the load.

In a stage F19, the control circuit calculates four successive values ΔZsn=Zsn−Zs (n−1), with n=1 to 4, corresponding to the difference between two consecutive values of Zsn. The four values ΔZsn are representative of the derivative of the impedance Zs calculated during four successive time intervals of the half-wave involved.

But the evolution of the impedance happens to be characteristic of the nature of the load. In a preferred embodiment, the evolution of the calculated derivative is compared to the evolution of the derivative of impedance curves representative of different types of load, stored in the control circuit and corresponding for example to the curves of FIGS. 11a to 11e.

In practice studying the evolution of the sign of the load impedance derivative on the relevant half-wave is representative of the type of load. The table below gives the evolution of this sign over the previously defined four time intervals for different types of load.

| | Time intervals | | | |
|---|---|---|---|---|
| Load | t0–t1 | t1–t2 | t2–t3 | t3–t4 |
| Incandescent bulb | + | + | + | +(or−) |
| Convector | 0 | 0 | 0 | 0 |
| Motor | + | − | − | − |
| Neon lamp | + | + | − | − |
| Switching power supply | − | + | + | + |

In the preferred embodiment of FIG. 12, the control circuit determines, at F20, the signs of ΔZsn, n=1 to 4, then at F21 compares their succession to stored values corresponding to the above table. The succession of the signs enables the type of load to be identified.

Analysis of the evolution of the calculated load impedance can also be performed using Fourier transform techniques and comparison with the Fourier transforms of curves representative of the different types of load. The number of measurements of Is and Vs during the half-wave may be different from 5. However, in practice, using the sign of the derivative is simpler and sufficient to distinguish the most common types of load.

Figure 5:
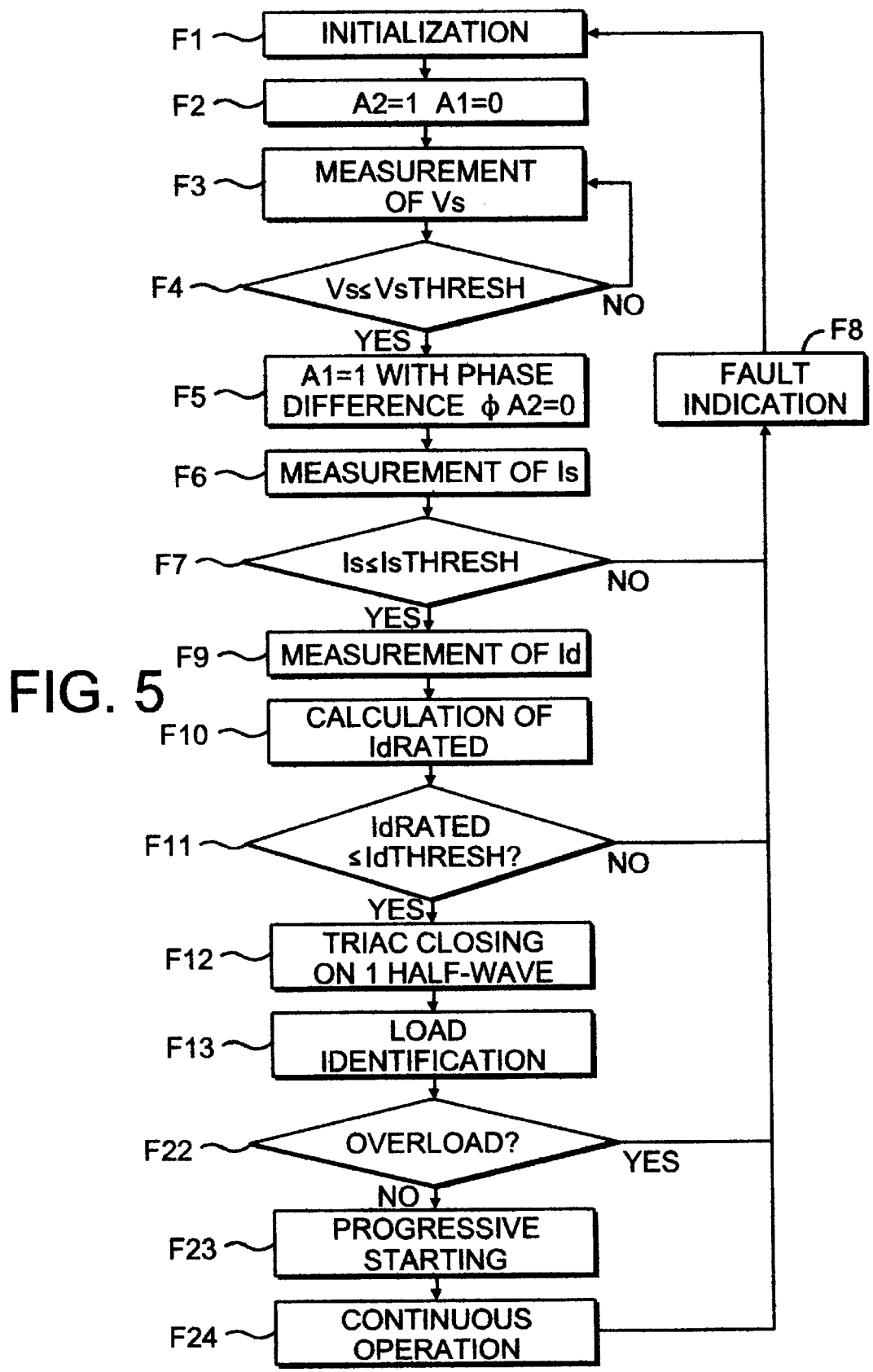
FIG. 5 represents a particular embodiment of an operation flowchart of the control circuit of the device according to FIGS. 1 or 3.

After identification of the nature of the load has been performed, the control circuit goes on to an overload detection stage F22 (FIG. 5). If an overload is detected, it goes on to the fault indication stage F8, indicating the overload. If not (No output of F22), the control circuit goes on, maybe via a progressive starting stage F23, to a continuous operation stage F24. During the stage F24, the power system voltage Vr is applied continuously to the load 5 via the first switch, i.e. either via the triac 6 (FIG. 1) or via the mechanical switch 10 (FIGS. 2 and 3) to which the control circuit 7 applies non zero signals A3.

Figure 13:
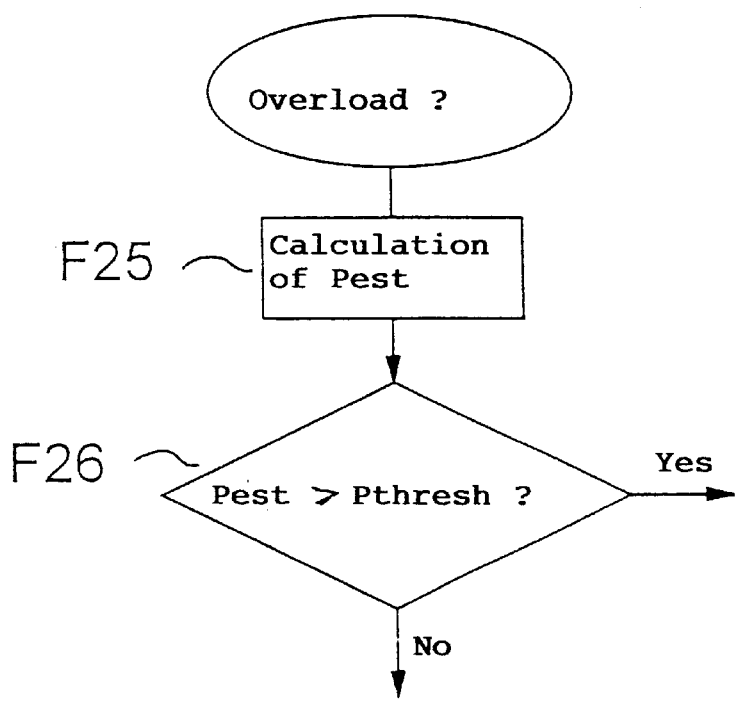
FIG. 13 represents a particular embodiment of the overload detection stage of FIG. 5.

For preventive detection of a possible overload, the control circuit takes account of the nature of the load which has just been identified. As represented in FIG. 13, overload detection begins by a stage F25 of calculation of the estimated rated power $P_{est}$ of the load. Then in a stage F26 it compares $P_{est}$ with a preset power threshold $P_{thresh}$ which corresponds to the rated power available at the output of the device, stored in the control circuit. If the estimated power is greater than the power threshold, the control circuit considers there is an overload. If not (No output of F26) it goes on to the continuous operation stage F24, possibly after a progressive starting stage F23 (FIG. 5).

The estimation of the rated power of the load is adapted to the type of load identified beforehand by the control circuit. Estimation is performed from the measurements of the current Is and voltage Vs made during the previous stages. The nature of the load determines the measurements able to be used.

Figure 14:
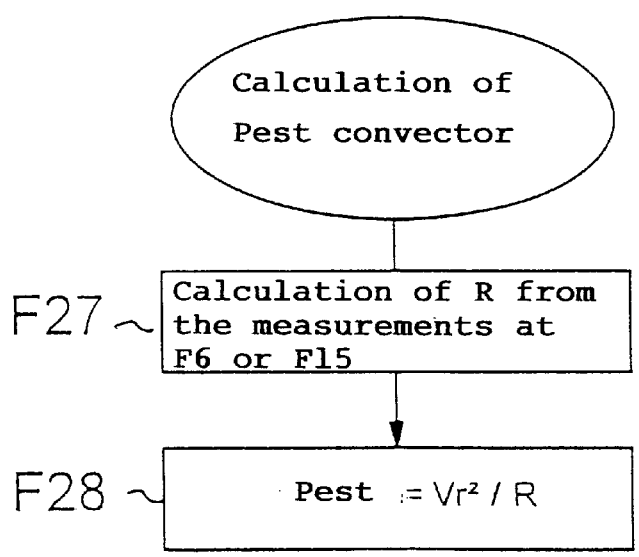
FIGS. 14 to 17 represent, in greater detail, a particular embodiment of the estimated power calculation stage of FIG. 13, in the case where the detected load is respectively a convector (FIG. 14), an incandescent bulb (FIG. 15), a fluorescent lamp (FIG. 16), a motor or a switching power supply (FIG. 17).

In the case of a convector, the load impedance is constant (FIG. 11b) and identical when hot or cold. The rated power system voltage Vr (e.g. 230 V) being known, the rated power can be calculated (FIG. 14) from the value R of the resistance (impedance Zs) calculated (F27) from the measurements made (at F15) during the load identification phase, for example cold, at the beginning (at t0) of the half-wave. The resistance value R of the convector can also be obtained from measurement (at F6) of the current Is performed during the short-circuit detection phase (φ being known, Vp is known). $P_{est}$ is given by: $P_{est}=Vr^2/R$ as represented in F28.

Figure 15:
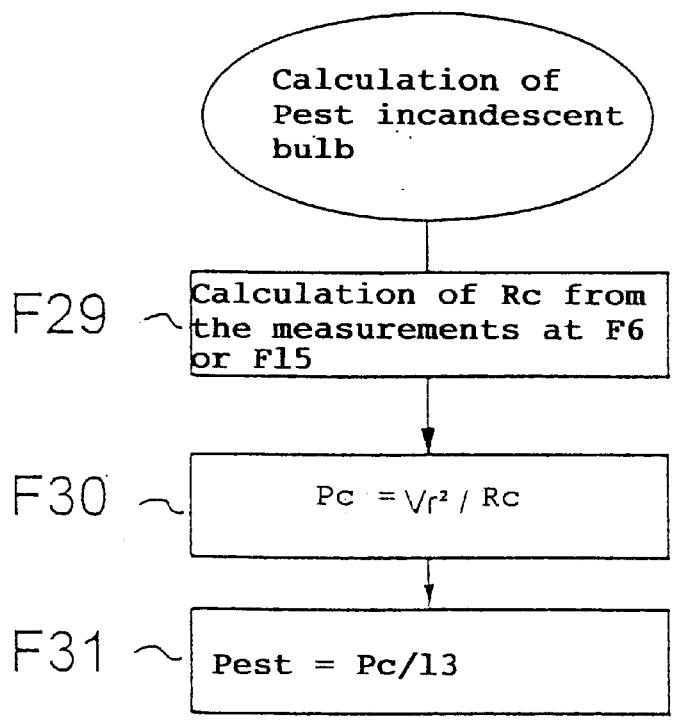

In the case of an incandescent bulb, the estimated rated power is equal to 1/13 of the power when cold Pc, i.e. $P_{est}=Pc/13=Vr^2/13Rc$, where Rc represents the resistance of the bulb filament when cold. The value of Rc can be calculated from the measurements made at F15, at the beginning (t0) of the half-wave, during the overload detection phase, or at F6 during the short-circuit detection phase, when the load is supplied under low power. Calculation of $P_{est}$ (F25) therefore comprises (FIG. 15) a stage F29 of calculation of Rc, a stage F30 of calculation of Pc and a stage F31 of calculation of $P_{est}$.

Figure 16:
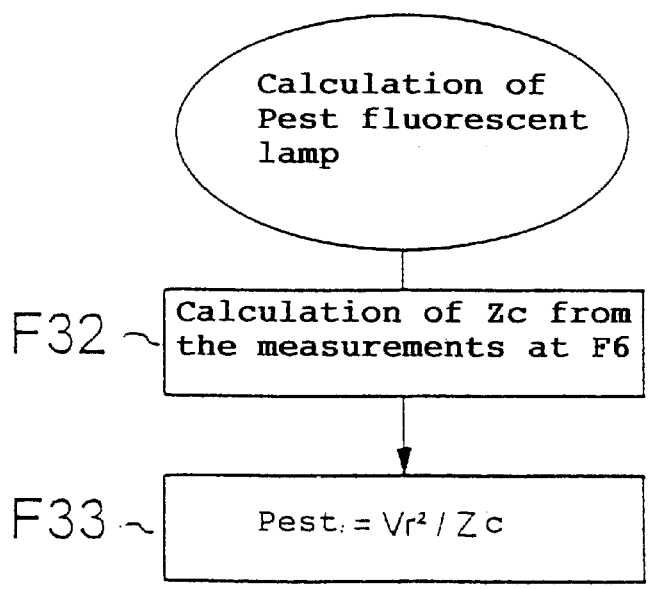

In the case of a fluorescent lamp, for example a neon tube, it is generally compensated by a capacitor whose value depends on the rated current. During the short-circuit detection phase, the tube is not ignited and the current Is measured during the stage F6 is mainly the capacitive current. This enables a measurement Zc of the cold impedance to be obtained (F32, FIG. 16). The estimated rated power $P_{est}$ is then calculated (at F33) from Zc:

$$P_{est}=Vr^2/Zc=(230)^2/Zc$$

Figure 17:
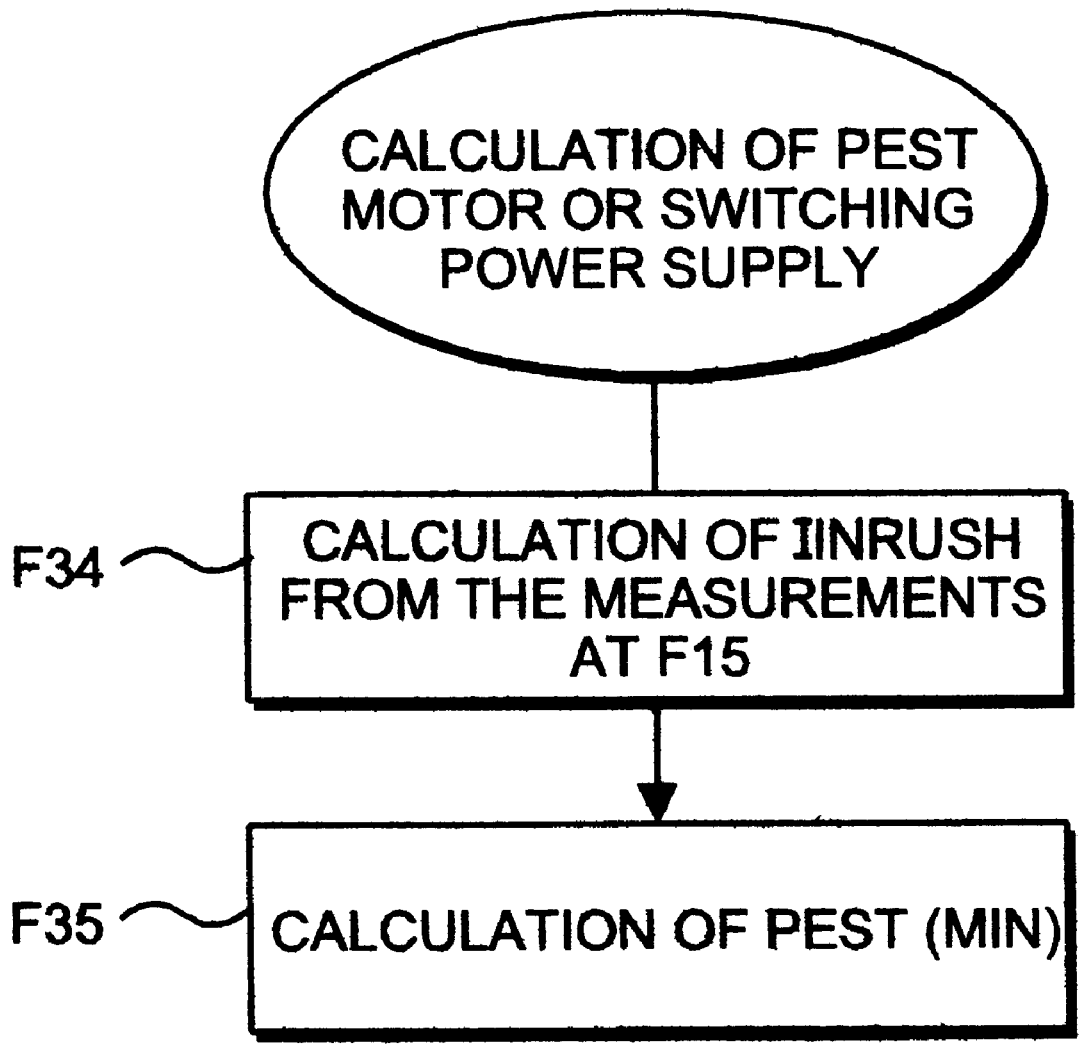

In the case of a motor, the control circuit calculates (F34, FIG. 17) the inrush current $I_{inrush}$ from the current values measured (at F15) during the half-wave t0–t4 during the load identification phase. According to the power and type of motor, the inrush current on the first half-wave is comprised between 2 and 6 times the rated current. The power in continuous operation is consequently considered to be comprised between a minimum rated power $P_{est}(min)=Vr \cdot I_{inrush}/6$, and a maximum rated power $P_{est}(max)=Vr \cdot I_{inrush}/2$. To prevent spurious fault detection, the control circuit uses the minimum estimated rated power (F35) as the estimated power value for overload detection.

In the case of a switching power supply, the inrush current can reach 10 to 20 times the rated current. The power in continuous operation is therefore comprised between a minimum rated power $P_{est}(min)=Vr \cdot I_{inrush}/20$, and a maximum rated power $P_{est}(max)=Vr \cdot I_{inrush}/10$. As in the case of a motor, it is the minimum estimated power that is calculated (F35) and used for overload detection.

The actual power of the motor or of the switching power supply may be greater than the minimum estimated power. If in this case the available power is lower than the actual power, there will be an overload when the load is powered on, an overload not detected beforehand by the device. As an example, if the estimated power is comprised between 1 KW and 2 KW, an overload is only detected preventively by the device if the available power is less than the minimum estimated power, i.e. 1 KW, solely taken into account by the device. If the available power is greater than 2 KW, there will not be any problem. If on the other hand the available power is comprised between the minimum and maximum estimated powers, for example 1.5 KW, the device considers that there is no overload whereas this may be the case if the actual power is greater than 1.5 KW. The device described does not enable the uncertainty to be cleared in this case. Such a solution is nevertheless acceptable for, in all cases, a conventional protection against short-circuit, overload and differential faults is always provided to function during the startup period and in continuous operation.

As an example, the progressive starting adopted can consist in a phase control by triac for an inductive load or in a control by phase interruption for a capacitive load.

The invention is not limited solely to the types of load described above, which are the loads the most frequently encountered, but extends to loads of all nature. For this, quantities representative of the form of the impedance curve of this type of load when a first voltage half-wave is applied thereto simply have to be stored in the control circuit memory to be able to compare to this curve the values calculated from quantities measured during the identification phase of the type of load.

Preventive fault detection, notably of differential, short-circuit or overload faults, prior to a rated power system voltage being applied to a load makes it possible to reduce the number of operations of a switchgear device fitted line-side and designed to perform protection of the power system and/or load in continuous operation, i.e. to provide selectivity of the assembly and reduce the wear of the switchgear device. In addition, this enables safety of both people and equipment to be improved. It also makes possible automatic reclosing of a switchgear device equipped with such a device, which enables a better continuity of service to be achieved.

We claim:

1. A device for preventive detection of faults in a load connected to an AC supply voltage, comprising:
    a first switch connectable to an AC supply voltage;
    a control circuit connectable to the same AC supply voltage comprising:
        load detection means,
        fault detection means,
        voltage measuring means,
        load current measuring means, and
        test means;
        said test means for temporarily connecting said first switch to the same AC supply voltage for a half-cycle of AC voltage during a first test phase so that said voltage measuring means measures an output voltage of said first switch, and said load current measuring means measures a current of a load; and
        said load detection means comprising impedance calculating means to calculate an impedance of the load based on a value of voltage from said voltage measuring means and a value of current from said load current measuring means, and comparing means for comparing the calculated impedance of the load with a plurality of predetermined impedance curves that represent a plurality of load types so that said load detection means identifies the load.

2. The device according to claim 1, wherein said comparing means compares a series of signs from a plurality of values representative of a derivative of an impedance versus time during the first test phase and compares said signs with a plurality of predetermined successions of signs representative of an impedance curve of each different type of load.

3. The device according to claim 2, wherein the plurality of values is equal to 4.

4. The device according to claim 1 wherein said fault detection means include means for detecting an overload comprising means for estimating a rated power of the load adapted to a type of load detected, means for comparing the estimated rated power with a preset power threshold representative of a power available on an output of the device, and means for indicating an overload if the estimated rated power exceeds the power threshold.

5. The device according to claim 4, wherein the type of load detected is one of a convector and an incandescent bulb, the means for estimating the rated power of the load comprising means for measuring a cold resistance of the load at the beginning of the first test phase or during a second test phase, during which said control circuit temporarily closes an electronic switch to apply said AC supply voltage to the load during a limited period of the AC voltage cycle, so that an instantaneous voltage applied to the load remains lower than a preset peak voltage which is much lower than a peak voltage of the AC supply voltage.

6. The device according to claim 4, wherein the type of load detected is a fluorescent lamp, said means for estimating the rated power of the load comprising means for measuring a cold resistance of the load during a second test phase, during which said control circuit temporarily closes an electronic switch to apply said AC voltage to the load during a limited period of the AC voltage cycle, so that an instantaneous voltage applied to the load remains lower than a preset peak voltage which is much lower than a peak voltage of the AC supply voltage.

7. The device according to claim 4, wherein the type of load detected is one of a motor and a switching power supply, said means for estimating the rated power comprising means for estimating a minimum rated power during the first test period, said means for detecting an overload comparing the estimated minimum rated power with the power threshold and producing an overload signal if said power threshold is lower than the estimated minimum rated power.

8. The device according to claim 1, wherein the said fault detection means further includes means for detecting a short-circuit comprising means for comparing the current measured in the load with a preset current threshold during a second test phase, during which said control circuit temporarily closes an electronic switch to apply the AC voltage to the load during a limited period of the AC voltage cycle, so that an instantaneous voltage applied to the load remains lower than a preset peak voltage which is much lower than a peak voltage of the AC supply voltage, and means for indicating a short-circuit if a measured current exceeds the current threshold.

9. The device according to claim 1, wherein said fault detection means includes means for detecting a differential fault by measuring a differential current in the load during a second test phase during which said control circuit temporarily closes an electronic switch to apply the AC voltage to the load during a limited period of the AC voltage cycles so that an instantaneous voltage applied to the load remains lower than a preset peak voltage which is much lower than a peak voltage of the AC voltage and means for comparing a differential current with a preset differential current threshold, and means for indicating a differential fault if a measured differential current exceeds the differential current threshold.

10. The device according to claim 1, comprising means for power-on of the load comprising a second switch connected, in series with a resistor of high value, in parallel to the first switch, means for closing the second switch during a prior test phase during which the first switch is open, means for comparing the output voltage of the first switch with a preset voltage threshold, said control circuit performing detection of the load, and fault detection if the output voltage during a prior test phase is lower than or equal to said voltage threshold.

11. The device according to claim 10, wherein said first switch comprises a mechanical switch;

an electronic switch is connected in series with a protective resistor of low value, and said electronic switch and protective resistor are connected; in parallel with said mechanical switch.

12. The device according to claim 10, wherein said first switch comprises a mechanical switch;

an electronic switch is connected in series with a protective resistor of low value, and said electronic switch and protective resistor are connected in parallel with said resistor of high value.

13. The device according to claim 1, wherein the control means perform progressive closing of the first switch suited to the type of load detected when no fault has been detected.

* * * * *